United States Patent
He

(10) Patent No.: US 6,796,816 B2
(45) Date of Patent: Sep. 28, 2004

(54) CARD CONNECTOR HAVING STRENGTHENED EJECTION MECHANISM

(75) Inventor: Haibin He, Kunsan (CH)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 10 days.

(21) Appl. No.: 10/310,513

(22) Filed: Dec. 4, 2002

(65) Prior Publication Data

US 2004/0038570 A1 Feb. 26, 2004

(30) Foreign Application Priority Data

Aug. 23, 2002 (TW) ...................................... 91213117 U

(51) Int. Cl.[7] .............................................. H01R 13/62
(52) U.S. Cl. ...................................... 439/159; 439/160
(58) Field of Search ................................ 439/159, 160, 439/152, 153–158

(56) References Cited

U.S. PATENT DOCUMENTS

| | | | |
|---|---|---|---|
| 5,551,853 A | * | 9/1996 | Cherry et al. ............... 418/148 |
| 6,082,650 A | * | 7/2000 | Okada et al. ............... 242/242 |
| 6,142,801 A | * | 11/2000 | Koseki et al. .............. 439/159 |

* cited by examiner

Primary Examiner—Alex Gilman
(74) Attorney, Agent, or Firm—Wei Te Chung

(57) ABSTRACT

A card connector (1) includes an insulative header (2), terminals (3) retained in the header, and an ejection mechanism (4) latchably mounted on the header. The header includes two arms (21), and defines passageways (2000) receiving the terminals. The ejection mechanism includes a driving device (40), and a swing arm (46) movably connected to the driving device. The driving device includes a combined portion (41) latchably mounted on one arm. A heart-shaped cam groove (411) is defined in a top wall of the combined portion. The groove has cam surfaces (4110–4115) formed thereat. A metallic piece (412) is provided on side walls of the combined portion at the groove, corresponding to two of the surfaces. The metallic piece enhances a strength of said side walls, and protects said side walls from friction wear when the ejection mechanism ejects an integrated circuit card out from the card connector.

9 Claims, 4 Drawing Sheets

CARD CONNECTOR HAVING STRENGTHENED EJECTION MECHANISM

BACKGROUND OF THE INVENTION

1. Field of the Invention

The present invention relates to the art of electrical connectors, and more particularly, to a card connector for integrated circuit (IC) cards having a strengthened ejection mechanism.

2. Description of the Prior Art

Compact flash card connectors have become popular in electronic equipment applications such as digital cameras and laptop and portable computers. Usually an ejection mechanism is equipped with the card connector. This is because the mating compact flash card is received inside a simple insertion slot in an enclosure of the electronic equipment. Once the mating card is engaged in the slot, it is hard to reach and pull out manually. The ejection mechanism can facilitate removal of the mating card. One kind of card connector is disclosed in "Technology Analysis of Card Connector Performance" (Connector Specifier, February 2001, pp. 48–52). Conventionally, the ejection mechanism of a card connector comprises a push button held by a frame of the ejection mechanism and movable along a card insertion/removal direction, and an eject lever rotatably supported by the card connector. One end of the eject lever is engaged with a distal end of the push button. To remove a card engaged in the card connector, the push button is pressed, the eject lever rotates, and a claw of the eject lever pushes a front rim of the card and forces the card to move outwardly. Thereupon, the card can be easily pulled out manually. However, the proximal end of the push button usually projects outside of the enclosure of the electronic equipment. The button may be accidental pushed, and an inserted IC card may be unexpectedly ejected. In addition, the push button is liable to be damaged or even broken by accidental impact or by excessive pushing force being applied by a user. Examples of the above-described ejection mechanisms are found in Taiwan Patent Publication Nos. 325154 and 314665.

A different kind of ejection mechanism for a card connector is disclosed in Taiwan Patent No. 275121, U.S. Pat. No. 5,655,918 and China Patent No. 99227777.9. Such ejection mechanism comprises an eject lever, a connecting lever releasably linked to a push button, and a heart-shaped cam mechanism holding the push button in a preset inmost position by means of a control pin. At the inmost position, the push button is almost received within the enclosure of the electronic equipment. The ejection mechanism also defines an outmost position of the push button, in which the push button projects substantially out from the enclosure. The ejection mechanism selectively transfers pushing force applied to the push button to the connecting lever, depending on which position the push button is located at the time the pushing force is applied. That is, when an inserted card is to be ejected, the push button is initially at the inmost position. The push button is pushed a first time, and moves to the outmost position by being guided by the heart-shaped cam mechanism. Simultaneously, the connecting lever engages with the eject lever. Then the push button is pushed a second time, and moves to the inmost position by being guided by the heart-shaped cam mechanism. Simultaneously, the pushing force applied is transferred via the control pin to the connecting lever, and the connecting lever drives the eject lever to push the card outward. The card is then easily withdrawn by hand from the enclosure.

This mechanism permits the push button to stay at the inmost position during normal use and operation of the electronic equipment, whether or not a mating card is received in the card connector. When the mating card is received in the card connector, electrical connection therebetween is secure and reliable, due to the safe location of the push button at the inmost position. However, when the control pin slides in the heart-shaped cam mechanism, it rubs along a wall of the cam mechanism at the sliding channel. Generally, the control pin is made of metallic material, and the cam mechanism is made of plastic material. The control pin is prone to wear out the cam mechanism after repeated use. This can adversely affect reliable operation of the ejection mechanism, and can even lead to breakage of the cam mechanism.

A new compact flash card connector which overcomes the above-mentioned problems is desired.

SUMMARY OF THE INVENTION

An object of the present invention is to provide a card connector having a strengthened ejection mechanism that minimizes friction wear.

Another object of the present invention is to provide a strengthened ejection mechanism that is latchably mounted to a card connector thereby facilitating assembly of the connector.

To achieve the above objects, a card connector comprises an insulative header, a multiplicity of terminals retained in the header, and an ejection mechanism latchably mounted on the header. The header comprises a pair of arms, and defines a multiplicity of terminal-receiving passageways receiving the terminals therein. The ejection mechanism comprises a driving device, and a swing arm movably connected to the driving device. The driving device comprises a combined portion latchably mounted on one arm of the header. A heart-shaped cam groove is defined in an inner face of a top wall of the combined portion. The groove has a plurality of cam surfaces formed thereat, the surfaces defining different groove depths and having different slopes. A metallic piece is provided on side walls of the combined portion at the groove, corresponding to two of the surfaces. The metallic piece enhances a strength of said side walls, and protects said side walls from friction wear when the ejection mechanism ejects an integrated circuit (IC) card out from the card connector.

Other objects, advantages and novel features of the invention will become more apparent from the following detailed description when taken in conjunction with the accompanying drawings, in which:

DESCRIPTION OF THE PREFERRED EMBODIMENT

Reference will now be made to the drawings to describe the present invention in detail.

Figure 1:
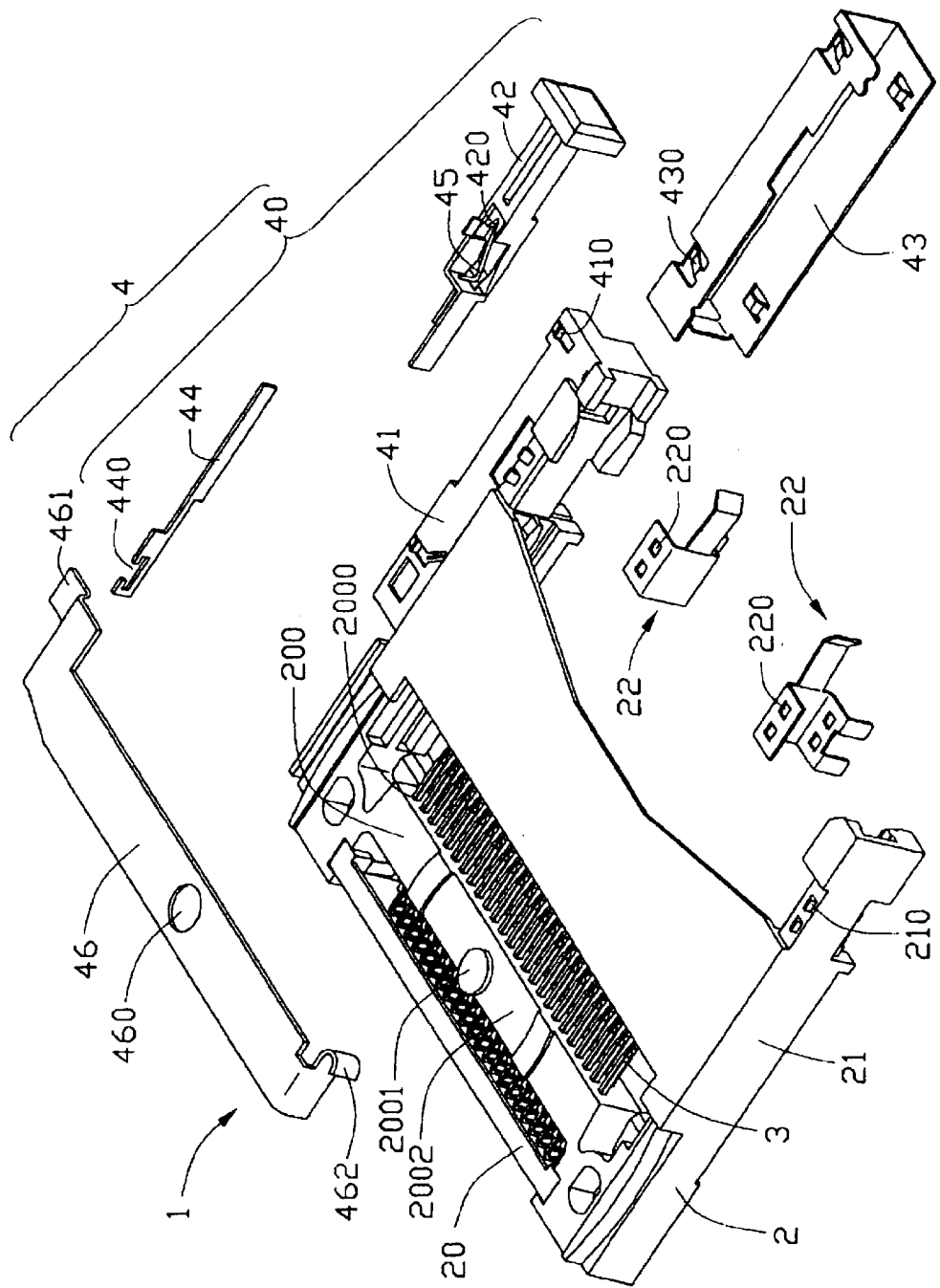
FIG. 1 is an exploded, isometric view of a card connector in accordance with a preferred embodiment of the present invention.
Figure 2:
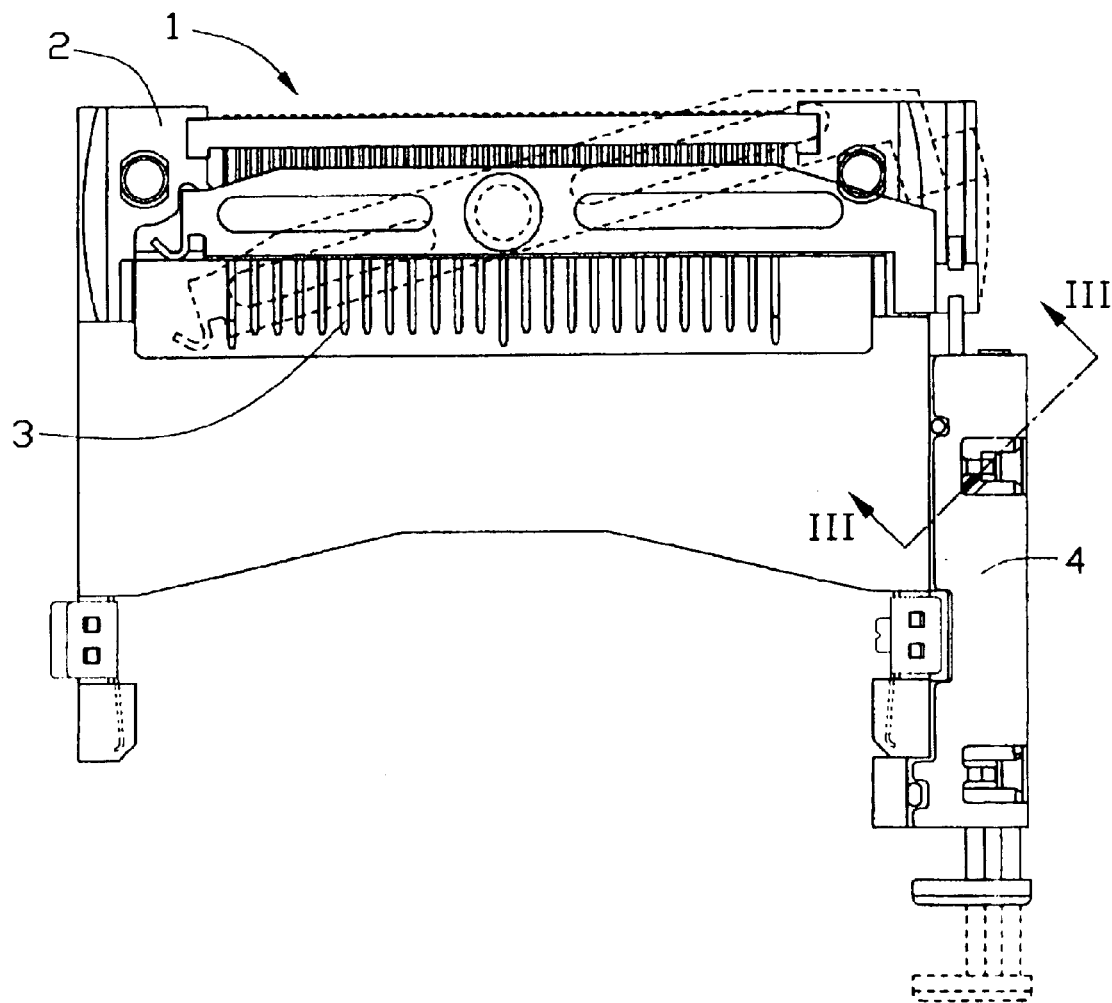
FIG. 2 is a top plan view of the card connector of FIG. 1 fully assembled, showing in dashed lines changed positions of a push bar and a swing arm thereof during operation thereof.
Figure 3:
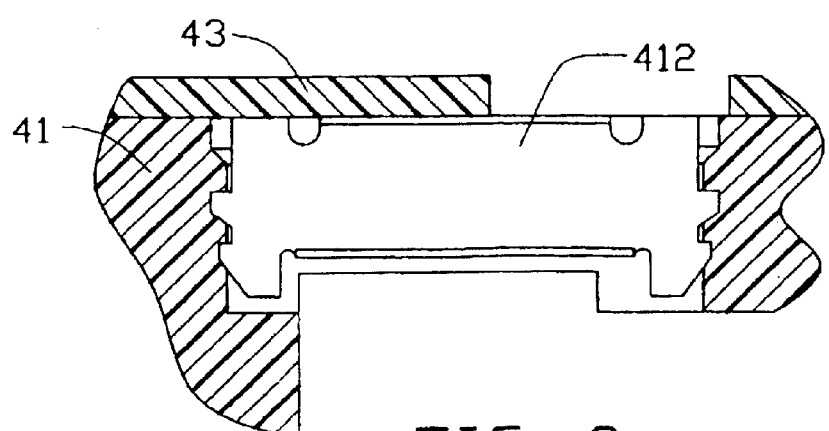
FIG. 3 is a cross-sectional view taken along line III—III of FIG. 2.

Referring to FIG. 1, a card connector 1 in accordance with a preferred embodiment of the present invention comprises an insulative header 2, a plurality of terminals 3 retained in the header 2, and an ejection mechanism 4 latchably mounted on the header 2.

Figure 4:
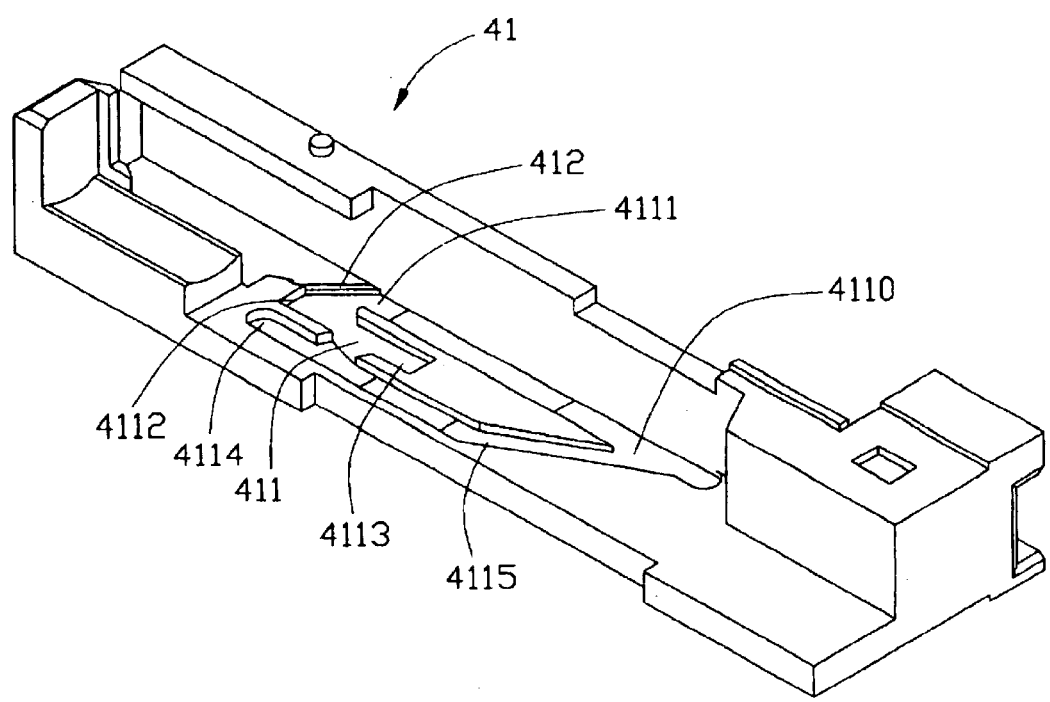
FIG. 4 is an enlarged, isometric inverted view of a combined portion of an ejection mechanism of the card connector of FIG. 1.

Referring to FIGS. 1 and 4, the header 2 comprises a main body 20. The main body 20 comprises a crossbeam 200, and a pair of arms 21 extending in a same direction from opposite ends of the crossbeam 200 respectively. The crossbeam 200 has a top surface 2002, and a pivot 2001 formed on a middle portion of the top surface 2002. A pair of protrusions 210 is formed on each of top and bottom faces of a distal end of each arm 21. A pair of metallic pressing parts 22 is respectively secured onto the distal ends of the arms 21. Each pressing part 22 comprises a pair of locking holes 220 in each of top and bottom plates thereof, for engagingly receiving the protrusions 210 of a corresponding arm 21. Each pressing part 22 comprises a flexible pressing arm, for positioning and grounding an integrated circuit (IC) card (not shown) inserted into a space between the arms 21. A multiplicity of terminal-receiving passageways 2000 is defined through the crossbeam 200 and arranged in an array, for receiving the terminals 3. One end of each terminal 3 is bent perpendicularly from the header 2 for electrically connecting to a printed circuit board (not shown). An opposite end of each terminal 3 protrudes from an inside face of the crossbeam 200, for electrically connecting a corresponding mating contact of the inserted IC card (not shown).

The ejection mechanism 4 comprises a driving device 40, and a swing arm 46 movably connected to the driving device 40. The driving device 40 comprises a combined portion 41 latchably mounted on one arm 21 of the header 2, a push bar 42, a metal cover 43, a connecting bar 44 and a control means 45.

A heart-shaped cam groove 411 is defined in an inner face of a top wall of the combined portion 41. The groove 411 movably receives one end of the control means 45 therein. The groove 411 has a plurality of cam surfaces 4110–4115 formed thereat, the surfaces 4110–4115 defining different groove depths and having different slopes. A metallic piece 412 is provided on side walls of the combined portion 41 at the groove 411, corresponding to the surface 4111 and the surface 4112. The metallic piece 412 enhances a strength of said side walls. The control means 45, with one end thereof received in the groove 411, moves along the groove 411 from the cam surface 4110 to the cam surface 4115 in that sequence (see FIG. 4). The push bar 42 rests on the combined portion 41 adjacent the groove 411. A hole 420 is defined in the push bar 42. The hole 420 movably receives an opposite end of the control means 45, so that the control means 45 can move freely between the combined portion 41 and the push bar 42 as it is guided along the groove 411. A pair of spaced protrusions 410 is formed on each of top and bottom surfaces of the combined portion 41. A pair of spaced apertures 430 is defined in each of top and bottom plates of the metal cover 43, engagingly receiving the protrusions 410 of the combined portion 41. The metal cover 43 thus encloses both the combined portion 41 and the push bar 42. The connecting bar 44 has one end releasably engaged with a driving end of the push bar 42. A recess 440 is defined in an opposite end of the connecting bar 44. The swing arm 46 is formed by stamping a metallic plate. A tab portion 461 is formed at one end of the swing arm 46, and engages in the recess 440 of the connecting bar 44. A hole 460 is defined in a middle of the swing arm 46, rotatably receiving the pivot 2001 of the crossbeam 200 of the header 2. An ejection hook 462 is formed at an opposite end of the swing arm 46.

Figure 5:
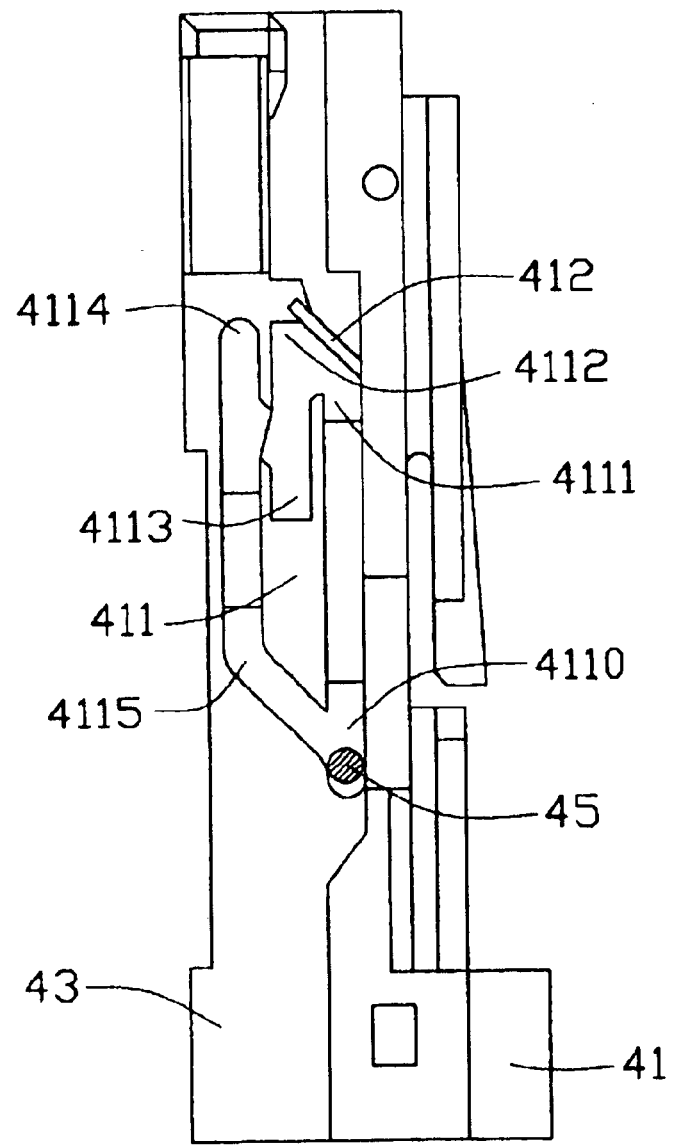
FIG. 5 is an enlarged, bottom plan view of the combined portion of the ejection mechanism of the card connector of FIG. 1, showing with hatched lines an end portion of a control means located in a heart-shaped cam groove of the combined portion.

Referring to FIGS. 1 and 5, in assembly, said opposite end of the control means 45 is inserted into the hole 420 of the push bar 42. The tab portion 461 of the swing arm 46 is engaged in the recess 440 of the connecting bar 44. The pivot 2001 of the crossbeam 200 is inserted into the hole 460 of the swing arm 46, thus pivotably connecting the swing arm 46 with the main body 20 of the header 2. The push bar 42 is mounted on the combined portion 41, and said one end of the control means 45 is placed into the groove 411 on the surface 4110. The pressing parts 22 are snappingly locked onto the respective distal ends of the arms 21. The metal cover 43 is engaged on the combined portion 41, with the protrusions 410 snappingly engaging in the apertures 430.

When a user wants to remove an inserted IC card (not shown), he/she pushes the push bar 42 inwardly. Said one end of the control means 45 slides along the groove 411 from the surface 4110 through to the surface 4115 in that sequence. When said one end of the control means 45 moves along the groove 411 from the surface 4111 to the surface 4112, it continuously rubs the metallic piece 412. Thus said side walls of the combined portion 41 at the surfaces 4111, 4112 are protected from friction wear. Said one end of the control means 45 then continues sliding to the surface 4113, causing the swing arm 46 to rotate about the pivot 2001 of the crossbeam 200, and thereby moving the ejection hook 462 to eject the inserted IC card (not shown). Thereupon said one end of the control means 45 returns to the surface 4110 via the surfaces 4114 and 4115. In this position, said one end of the control means 45 is ready to eject a next inserted IC card.

While a preferred embodiment in accordance with the present invention has been shown and described, equivalent modifications and changes known to persons skilled in the art according to the spirit of the present invention are considered within the scope of the present invention as defined in the appended claims.

What is claimed is:

1. A card connector for interconnecting an integrated circuit cad with a circuit board on which the card connector is mounted, the card connector comprising:

an insulative header defining a plurality of terminal-receiving passageways therein;

a plurality of terminals received in corresponding passageways of the header, for connecting with corresponding mating contacts of the card;

a card ejection mechanism adapted to release a card from the card connector, the card ejection mechanism comprising a combined portion, a heart-shaped cam groove being defined in the combined portion, a plurality of cam surfaces being defined at the cam groove, the cam surfaces defining different groove depths and having different slopes, and at least one metallic piece being provide at a wall of the combined portion corresponding to two of the cam surfaces, at an inverse-point position, wherein the ejection mechanism further comprises a driving device, and the driving device comprises a metallic cover and a control means slidably received in the cam groove, wherein the metallic piece confronts the control means during a final stage of ejection of the electronic card.

2. The card connector as claimed in claim 1, wherein the header forms a pivot.

3. The card connector as claimed in claim 1, wherein the ejection mechanism further comprises a swing arm defined a hole therein, the hole pivotably receiving the pivot of the header.

4. The card connector as claimed in claim 1, wherein the combined portion comprises a plurality of protrusions engaging with the metallic cover.

5. The connector as claimed in claim 1, wherein said inverse-point position is essentially located in a front portion of the groove.

6. An ejection mechanism for an integrated circuit card connector, the ejection mechanism comprising:

a driving device including a combined portion engaged with the card connector, a push bar attached on the combined portion, and a connecting bar connected with the push bar; and a swing arm connecting to the driving device; wherein a heart-shaped cam groove is defined in the combined portion, a plurality of cam surfaces is defined at the cam groove, the cam surfaces define different groove depths and have different slopes, and at least one metallic piece is provided at a wall of the combined portion corresponding to two of the cam surfaces, at an inverse-point position, wherein the ejection mechanism further comprises a control means movably received in the cam groove, wherein the metallic piece confronts the control means during a final stage of ejection of the electronic card.

7. The ejection mechanism as claimed in claim 6, further comprising a metallic cover mounted on the combined portion.

8. The ejection mechanism as claimed in claim 7, wherein the combined portion comprises a plurality of protrusions.

9. The ejection mechanism as claimed in claim 8, wherein the metallic cover defines a plurality of apertures engagingly receiving the protrusions of the combined portion.

* * * * *